United States Patent [19]

Brown

[11] 4,217,747
[45] Aug. 19, 1980

[54] LAWN MOWER GRASS CATCHER ASSEMBLY

[75] Inventor: Thomas Brown, Mechanicsburg, Pa.

[73] Assignee: The Perfection Manufacturing Company, St. Louis, Mo.

[21] Appl. No.: 9,153

[22] Filed: Feb. 5, 1979

Related U.S. Application Data

[63] Continuation-in-part of Ser. No. 817,716, Jul. 21, 1977, Pat. No. 4,151,702.

[51] Int. Cl.² ............................................. A01D 35/22
[52] U.S. Cl. ....................................................... 56/203
[58] Field of Search ................................... 56/194–206, 56/16.6

[56] References Cited

U.S. PATENT DOCUMENTS

| | | | |
|---|---|---|---|
| 2,955,404 | 10/1960 | Strasel et al. | 56/202 |
| 3,134,214 | 5/1964 | Shaw | 56/202 |
| 3,668,846 | 6/1972 | Knight | 56/205 |
| 3,722,192 | 3/1973 | Corbett | 56/202 |

Primary Examiner—Russell R. Kinsey
Attorney, Agent, or Firm—Cohn, Powell & Hind

[57] ABSTRACT

A grass catcher having a container and lid operatively attached to the lawn mower to receive grass cuttings in a grass catching mode and nestably related on the lawn mower in a storage mode for shipping. In the grass catching mode the lid is mounted to the lawn mower handle and includes downturned side flanges provided with a longitudinal guide track. The container is relatively deep and includes a rearwardly formed chute portion and upper side flanges engageable with the guide track, so that the container can be selectively separated from the lid. In the storage mode the container is inverted and disposed over the lawn mower motor assembly with the chute disposed rearwardly. The lid is nestably received by the container and can be shipped with the lawn mower in a container only slightly larger than that required to ship the lawn mower itself.

5 Claims, 13 Drawing Figures

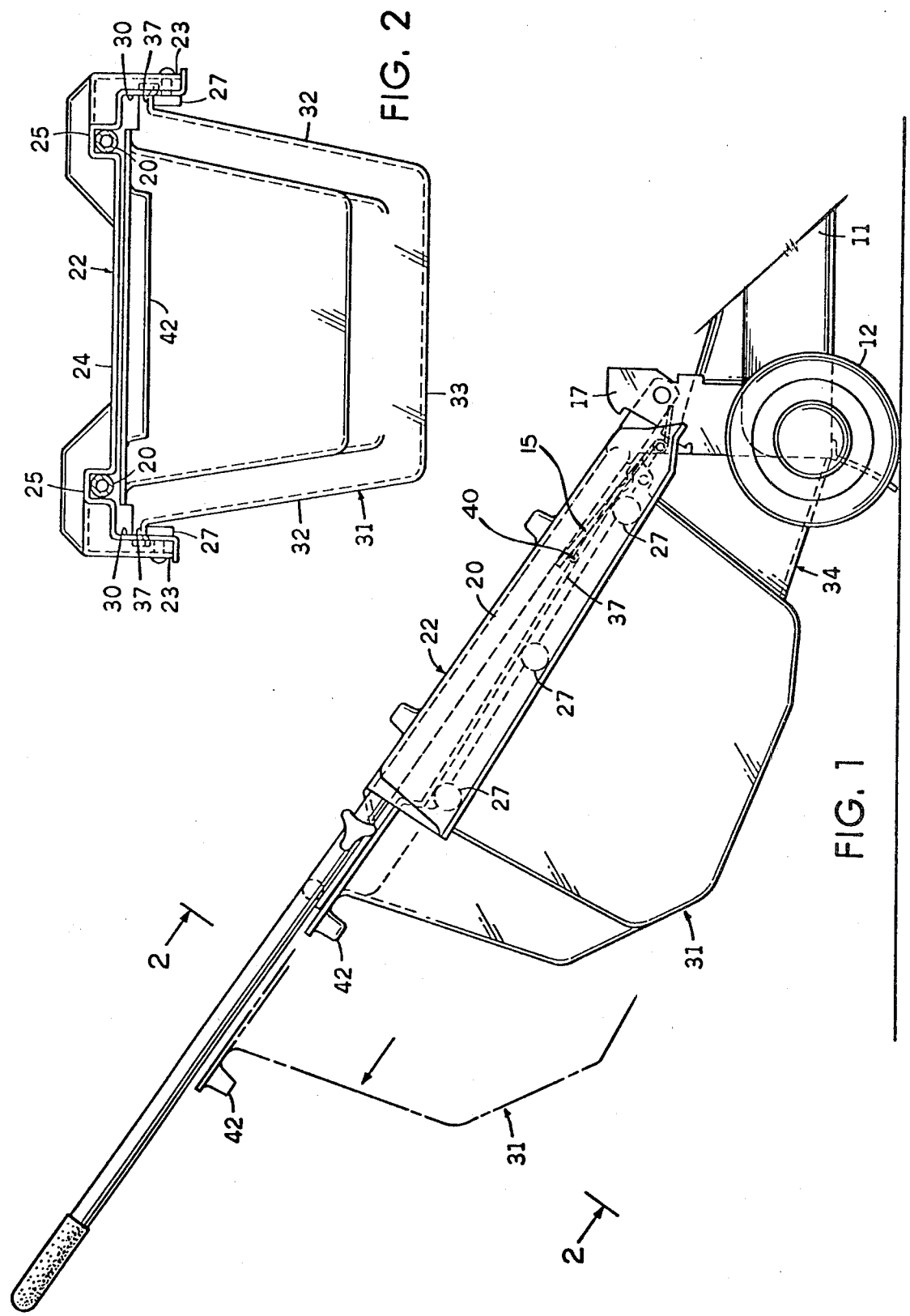

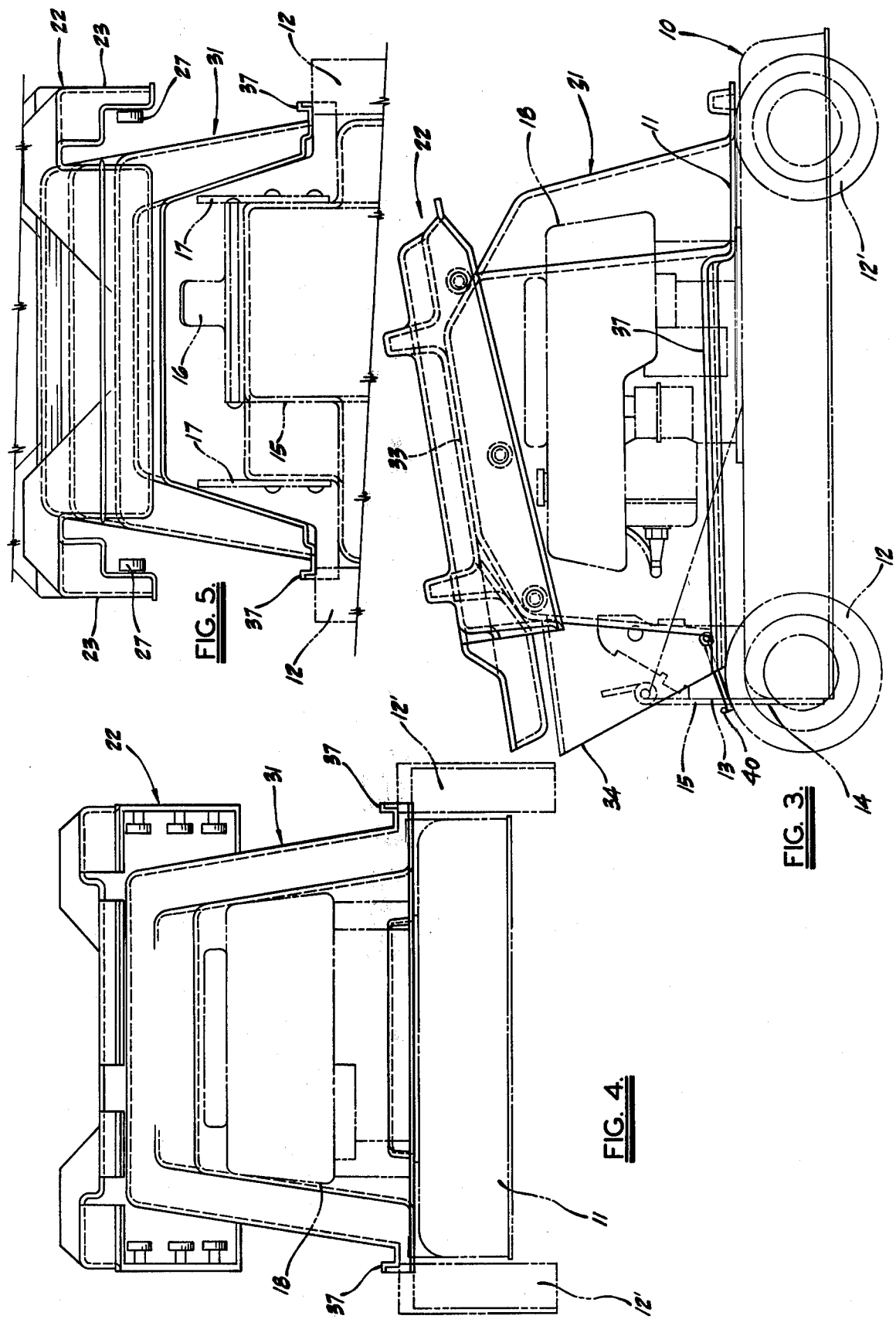

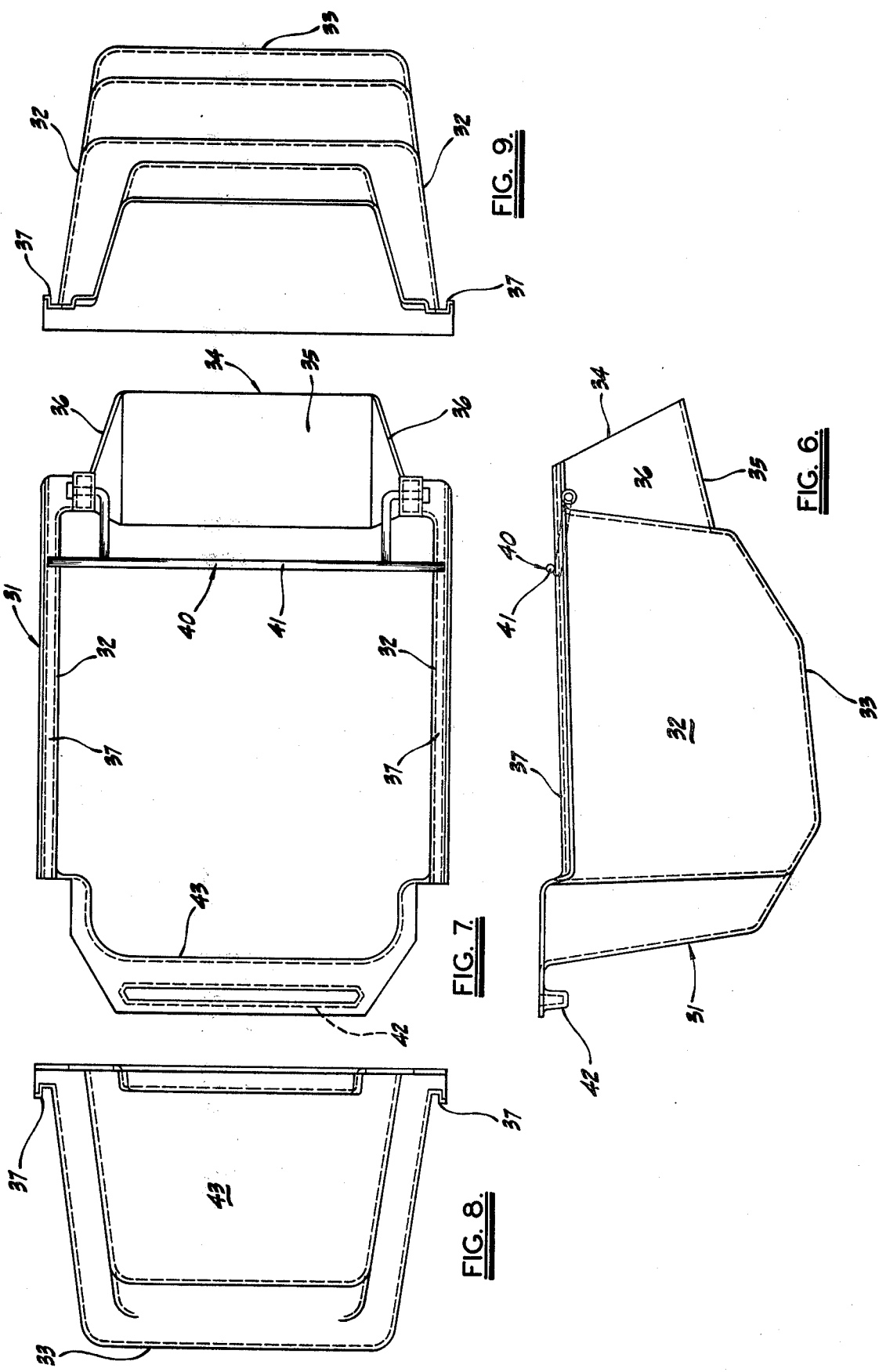

LAWN MOWER GRASS CATCHER ASSEMBLY

RELATED U.S. APPLICATION DATA

Continuation-in-part of Ser. No. 817,716 filed July 21, 1977 which is now U.S. Pat. No. 4,151,702.

BACKGROUND OF THE INVENTION

This invention relates generally to improvements in a grass catcher, and more particularly to an improved, rigid grass catcher which can be broken down into parts for storage.

With the previously known rigid catchers for rear discharge mowers, the catcher had to be completely removed from the mower in order to be emptied, and then had to be completely replaced as a unit. In addition, the lawn mower and catcher were generally shipped separately because an oversize shipping container would be required for shipping both units together.

SUMMARY OF THE INVENTION

With the present grass catcher in the grass catching mode, the lid is retained on the mower handles thereby requiring that only the container be removed for emptying the grass. The interconnection between the lid and the container permits quick, easy removal and replacement of the container. In the storage mode the container and the lid are nested together and disposed over the lawn mower assembly. The lawn mower and catcher assembly can thereby be shipped as a unit in a single, relatively small shipping container.

The lawn mower and grass catcher assembly includes a lawn mower having a housing including an upper deck portion and a motor assembly projecting above said upper deck portion. The rigid grass catcher is operatively mounted to the lawn mower in a first disposition of parts providing a grass catching mode and is operatively mountable to the lawn mower in a second disposition of parts providing a storage mode.

The rigid catcher includes a first hollow body section having a depth at least substantially equal to the height of the motor assembly and being receivable over the motor assembly to provide a hood therefore in the storage mode and a second hollow body section having a shallower depth than said first section and being receivable in nested relation over said first section in said storage mode.

The first section includes inclined sidewalls having longitudinal margin portions and a transverse wall disposed in spaced relation from said margin portions, said sidewalls tending to converge in a direction away from said margin portions. The second body section includes sidewalls having longitudinal margin portions cooperating with the longitudinal margin portions of the first section to provide a container for grass cuttings in the grass catching mode and having a transverse wall disposed in spaced relation from said margin portions, said transverse wall having a width generally greater than the width of the transverse wall of said first section whereby said first transverse wall is received between said second body section sidewalls.

The first body section is generally frusto-pyramidical in configuration and the transverse walls of both sections are engageable in the storage mode. The transverse margin portions of the first body are engageable with the lawn mower housing in the storage mode.

BRIEF DESCRIPTION OF THE DRAWINGS

FIG. 1 is a side elevation of the grass catcher and mower in a grass catching mode, the phantom lines indicating the position assumed by the container during attachment and detachment of the container to the lid;

FIG. 2 is a cross sectional view taken on line 2—2 of FIG. 1;

FIG. 3 is a side elevational view of the grass catcher and mower in a storage mode with the mower handle removed for clarity;

FIG. 4 is a front elevational view of the grass catcher and the lawn mower in a storage mode;

FIG. 5 is a rear elevational view of the grass catcher and mower in a storage mode;

FIG. 6 is an elevational view of the container;

FIG. 7 is a top plan view of the container;

FIG. 8 is a rear end view of the container;

FIG. 9 is a front end view of the container;

DESCRIPTION OF THE PREFERRED EMBODIMENT

Figure 13:
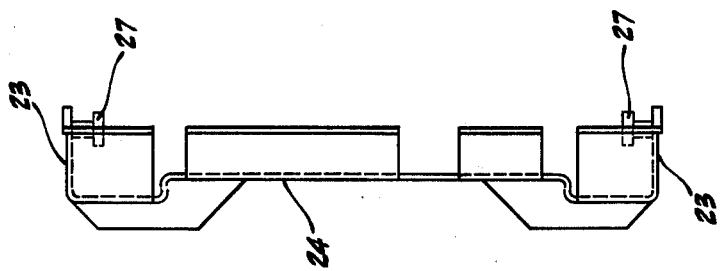
FIG. 13 is a front elevational view of the lid.

Referring now by reference numerals to the drawings, and first to FIG. 1, it will be understood that the lawn mower indicated by 10 includes a deck housing 11 mounted on a pair of rear wheels 12 and front wheels 12. The housing 11 includes a rear wall 13 which is provided with a rear discharge opening 14 (FIG. 3). Hingedly mounted to the top rear of the deck housing 11 is a cover plate 15 adapted to uncover and thereby open the rear discharge opening 14 in one position as shown in FIG. 1, and to close said opening as shown in FIG. 3. Formed integrally with the cover plate 15 and extending upwardly above the hinge connection, is a tab 16 that can be gripped in order that the operator may raise the cover plate 15 and open the rear discharge opening 14. Pivotally mounted to a pair of laterally spaced brackets 17 attached to the rear top of the mower housing 11, are a pair of rearwardly extending handle members 20. A motor assembly 18 is disposed above the deck housing 11.

Figure 11:
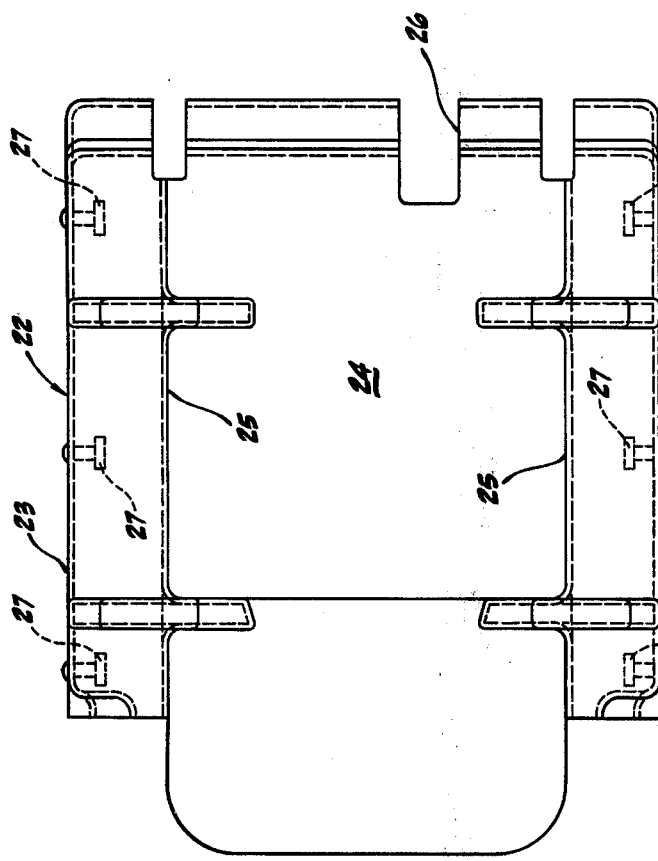
FIG. 11 is a top plan view of the lid.
Figure 10:
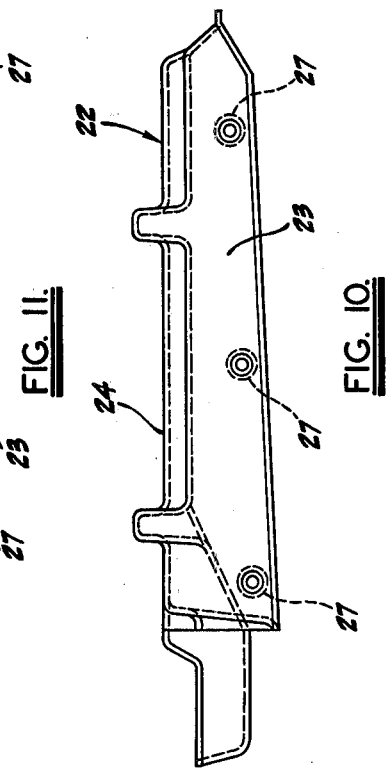
FIG. 10 is a side elevational view of the lid.
Figure 12:
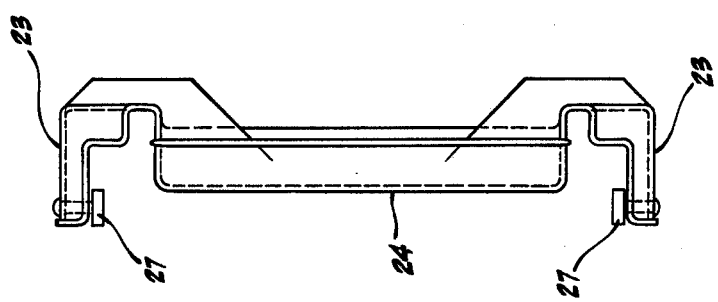
FIG. 12 is a rear end elevational view of the lid.

The lawn mower 10 is provided with a rigid, rear discharge grass catcher indicated by 21. The grass catcher 21 includes two primary components, namely a container 31 and a lid 22 constituting first and second hollow body sections. In the grass catching mode, which is shown in FIGS. 1 and 2, the grass catcher 21 is carried by the handle member 20 at the rear of the mower housing 11. In the storage mode, which is shown in FIGS. 3 and 4, the lid 22 and container 31 are mounted over the motor assembly 18. The structural relationship of parts will be described first with reference to the grass catching mode shown in FIGS. 1 and 2, the components 22 and 31 being shown in greater detail in FIGS. 5-12.

The grass catcher lid 22 (FIGS. 10-13) includes opposed, downturned side flanges 23 interconnected by a transverse web 24 adapted to seat on handle member 20. The lid 22 includes a positioning means for engaging the handle members 20 for holding the lid 22 on the handle member 20. This positioning means includes a pair of downwardly open, longitudinal channels 25 in the lid web 24 that are adapted to receive the handle member 20.

The front margin of lid web 24 is provided with a slot 26 (FIG. 11) through which the cover plate tab 16 can project for access thereto in order that the operator may selectively raise the cover plate 15 when the lid 22 is seated on the handle member 20.

Guide means are provided on the side flanges 23 of the lid 22, the guide means including upwardly facing surfaces as provided by a plurality of longitudinally spaced rollers 27 mounted on the inside of the lid side flanges 23. The rollers 27 are spaced below the lid web 24 to define therewith guide tracks that open rearwardly of the lid 22.

The grass catcher container 31 (FIGS. 6-9) includes opposed side walls 32 and an interconnecting transverse bottom wall 33. As is best shown in FIG. 7, the container 31 includes a chute 34 at its front end having a bottom wall 35 and side walls 36 that embrace the bottom and sides of the rear discharge opening 14 of the mower housing 11 when the container 31 is operatively attached to the lid 22.

The side walls 32 of the container 31 are provided with laterally extending flanges 37, constituting interconnecting means, which are received selectively in the guide tracks 30 of the lid 22 and seat on the rollers 27 when the container 31 is attached to the lid 22.

Pivotally connected to the side walls 32 at the front of the container 31, is a bail indicated by 40. The bail 40 includes a bight portion 41 engageable with and seating on the laterally extending flanges 37 of the container 31 in the folded position of the bail 40. When the container 31 is attached to the lid 22, the lateral extensions of the bight portion 41 of the bail 40 are received in the guide tracks 30 of the lid 22. When the container is detached, the bail 40 can be raised so that it can be utilized by the user to facilitate carrying and emptying of the container 31.

As the container 31 is attached to the lid 22, the bight portion 41 of bail 40 is seated on the container flanges 37 in its folded position. Before the container 31 is fully attached as the container flanges 37 move longitudinally on the lid rollers 27, the cover plate 15 is raised to a position above the bight portion 41 of the bail and is held in the raised position until the container 31 is moved forwardly a sufficient distance so that the bight portion 41 underlies and supports the cover plate 15. Therefore, when the container 31 is operatively attached to the lid 22, the rear discharge opening 14 of the mower housing 11 opens into the container chute 34 so that grass cuttings can move directly through the rear discharge opening 14 and into the container 31.

In the storage or transportation mode, shown in FIGS. 3 and 4, the container 31, which provides a first hollow body section, is inverted and disposed over the motor assembly 18 such that it provides a hood for said motor assembly. In this position the chute 34 faces rearwardly and provides an opening receiving the brackets 17 and the relatively narrow rear discharge opening formation, it being understood that the handle members are removed for the storage mode. In the embodiment shown, the container lateral flanges 37 engage the rearward upper portion of the lawn mower deck housing 11 and the forward flange 43 engages the forward portion of said housing. It will be understood, however, that the grass catcher 21 can be used with other lawn mower models than that shown and that therefore the lateral flanges 37, for example, might engage the front wheels 12 rather than the upper forward portion of the deck housing 11.

It is thought that the functional advantages of the grass catcher have become fully apparent from the foregoing detailed description of parts, but for completeness of disclosure, the assembly and usage of the catcher will be briefly described.

To assemble the catcher 21 to the mower in the grass catching mode, the lid 22 is placed on top of the handle members 20, and more particularly with the handle members 20 located in the downwardly open lid channels 25. In this position, the front slot 26 of the lid 22 receives the cover plate tab 16, and the lid side flanges 23 are located outwardly of the handle members 20.

The container 31 is lifted by the bail 40 at the front end by the hand grip 42 at the rear end, and is then raised to a position below the handle members 20 immediately behind the lid 22 with the container flanges 37 aligned with the rearwardly opening guide tracks 30. The container 31 is moved forwardly into the lid 22 with the container flanges 37 moving into the guide tracks 30 and on top of the rollers 27. Before the container 31 is completely slidably assembled to the lid 22, the user grips the cover plate tab 16 and raises the cover plate 15 up against the lid web portion 24 so that it is above the bight portion 41 of the bail 40. While the cover plate 15 is held in this raised position, the container 31 is moved forwardly until the bail bight portion 41 moves under the cover plate 15 and thereby holds the cover plate 15 in the raised position. Then the container 31 is moved completely forward until the rear wall 43 of the container 31 engages the rear flange 44 of lid 22. The lid 22 and container 31 are now completely attached and the container 31 is positioned with the chute 35 embracing the rear discharge opening 14 of the mower housing 11.

When the container 31 is filled with grass clippings and it is desired to empty the catcher, the container 31 is simply moved rearwardly relative to the lid 22 while the lid 22 remains seated on the handle members 20. The container flanges 37 move easily out of the guide tracks 30 on the rollers 27. As the bail bight portion 41 moves out from under the cover plate 15, the spring-loaded cover plate 15 will fall to its closed position relative to the rear discharge opening 14 thereby precluding any material being thrown out of such opening 14 and into the container 31 as the container 31 is finally separated from the lid 22. Moreover, the closed cover plate 15 will preclude objects from being thrown through the rear discharge opening 14 when the container 31 is completely detached.

It will be understood that when the container 31 is completely detached from the lid 22, the lid 22 remains in its seated position on the handle members 20 ready for reinsertion of and reconnection with the container 31.

In the storage mode the lid 22 overfits the container bottom wall 33 which, of course, is uppermost in this mode. The container 31 is of a generally frusto-pyramidical configuration and is therefore somewhat narrower at the bottom than the width of lid 22. This permits a nesting relation between the two components in which the lid 22 transverse wall 24 engages the container bottom wall 33. As shown clearly in FIGS. 4 and 5 the larger overall width of the lid provides adequate clearance for the lid side flanges 23 and the rollers 27.

The lid 22 and container 31, when disposed in the storage mode, are ideally suited for shipping the lawn mower 10 and the rigid grass catcher 21 as a unit. In this mode the handle members 20 are not installed and the container 31 is simply inverted and disposed over the motor assembly 18 with the chute 34 facing rearwardly. Depending upon the particular configuration of the lawn mower deck housing 11, the bail 40 can be maintained in the position substantially as shown in FIG. 6 or can be rotated forwardly into the position as shown in FIG. 3. The lawn mower and rigid catcher assembly can be conveniently shipped in a relatively small carton only slightly larger than the carton required for shipping the lawn mower alone.

I claim as my invention:

1. In a lawn mower and rigid grass catcher assembly:
   (a) a lawn mower including:
      1. a housing having an upper deck portion,
      2. a motor assembly projecting above said upper deck portion, and
   (b) a rigid grass catcher operatively mountable to the lawn mower in a first disposition of parts in a grass catching mode, and operatively mountable to the lawn mower in a second disposition of parts in a storage mode, said catcher including:
      1. a first hollow body section having a depth at least substantially equal to the height of the motor assembly and receivable over the motor assembly to provide a hood therefor in the storage mode, and
      2. a second hollow body section having a shallower depth than said first body section and receivable in nested relation over said first body portion in the storage mode.

2. An assembly as defined in claim 1, in which:
   (c) said first section includes inclined sidewalls having longitudinal margin portions and a transverse wall disposed in spaced relation from said margin portions, side sidewalls tending to converge in a direction away from said margin portions, and
   (d) said second section includes sidewalls having longitudinal margin portions cooperating with the longitudinal margin portions of the first section in the grass catching mode and a transverse wall disposed in spaced relation from said margin portions, said transverse wall having a width generally greater than the width of said first portion transverse wall.

3. An assembly as defined in claim 2, in which:
   (e) said first section is generally frusto-pyramidical in configuration.

4. An assembly as defined in claim 2, in which:
   (e) said transverse walls are engageable in the storage mode.

5. An assembly as defined in claim 2, in which:
   (e) the longitudinal margin portions of the first section are engageable with the lawn mower housing in the storage mode.

* * * * *

UNITED STATES PATENT AND TRADEMARK OFFICE
CERTIFICATE OF CORRECTION

PATENT NO. : 4,217,747
DATED : August 19, 1980
INVENTOR(S) : Thomas Brown

It is certified that error appears in the above–identified patent and that said Letters Patent are hereby corrected as shown below:

Column 6, Line 7, delete the word "side" and substitute the word --said--.

Signed and Sealed this

Twenty-eighth Day of October 1980

[SEAL]

Attest:

SIDNEY A. DIAMOND

Attesting Officer

Commissioner of Patents and Trademarks